No. 800,727. PATENTED OCT. 3, 1905.
R. F. EASTON.
CENTERING.
APPLICATION FILED OCT. 21, 1904.
3 SHEETS—SHEET 1.
FIG. 1.
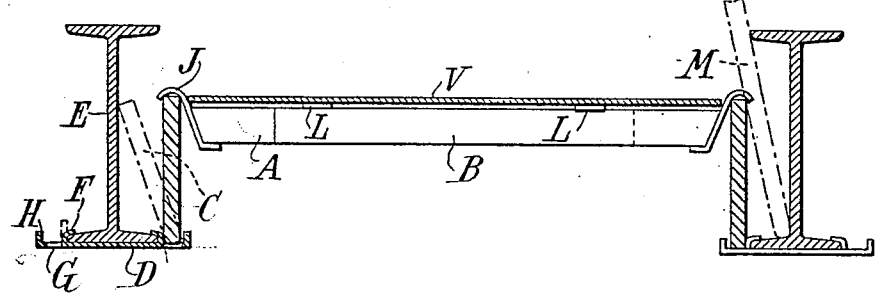
FIG. 2.
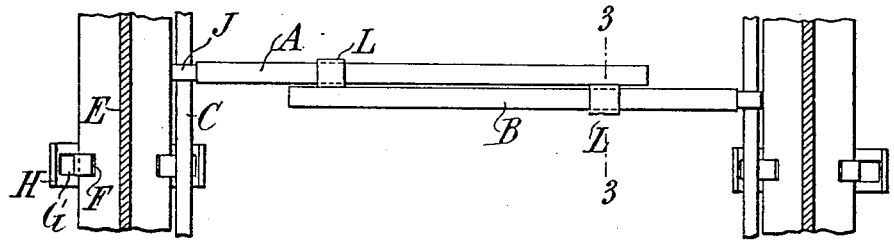
FIG. 3. FIG. 4. FIG. 5.
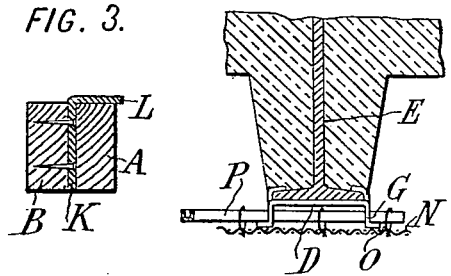
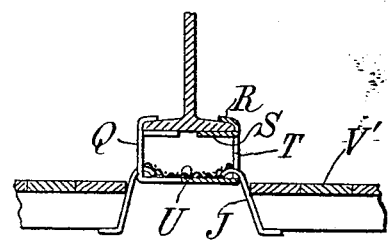
FIG. 13. FIG. 6.
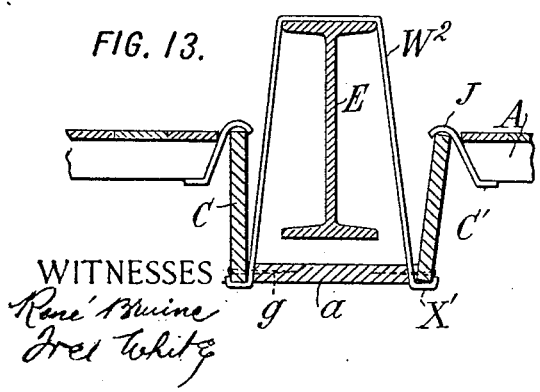
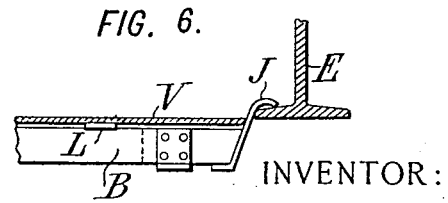
WITNESSES
René Bruine
Fred White
INVENTOR:
Roswell F. Easton,
By Attorneys,
Arthur E. Fraser & Co.

No. 800,727. PATENTED OCT. 3, 1905.
R. F. EASTON.
CENTERING.
APPLICATION FILED OCT. 21, 1904.

3 SHEETS—SHEET 2.

WITNESSES:
René Muine
Fred White

INVENTOR:
Roswell F. Easton,
By Attorneys,
Arthur C. Fraser

No. 800,727. PATENTED OCT. 3, 1905.
R. F. EASTON.
CENTERING.
APPLICATION FILED OCT. 21, 1904.

3 SHEETS—SHEET 3.

WITNESSES:
Fred White
René Bruine

INVENTOR:
Roswell F. Easton,
By Attorneys,

UNITED STATES PATENT OFFICE.

ROSWELL F. EASTON, OF NEW YORK, N. Y.

CENTERING.

No. 800,727.  Specification of Letters Patent.  Patented Oct. 3, 1905.

Application filed October 21, 1904. Serial No. 229,513.

*To all whom it may concern:*

Be it known that I, ROSWELL F. EASTON, a citizen of the United States, residing in the borough of Manhattan, city, county, and State of New York, have invented certain new and useful Improvements in Centering, of which the following is a specification.

My invention aims to provide an improved centering for the erecting of floors and similar structures and which is especially adapted to the ordinary concrete flooring supported upon steel I-beams or similar supports.

An important feature of the invention is the means for adjusting the length or span of the center, which is adapted for an extreme variation.

A new method and means for supporting the centering joists are also provided, and various details of improvement whereby the original cost is kept down and the salvage is increased and whereby with very little change the centering can be adapted for floors of various designs and whereby also the centering can be erected and removed very easily.

Various other features of improvement are referred to in detail hereinafter.

The accompanying drawings illustrate embodiments of the invention.

Figure 12:
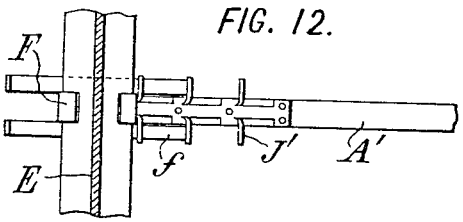
Figure 14:
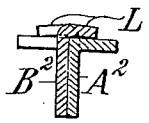
Figure 15:
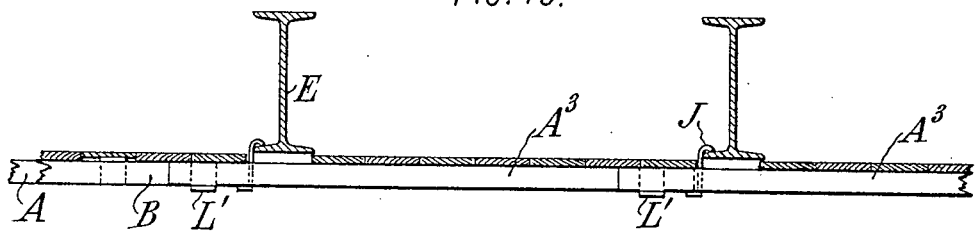
Figure 16:
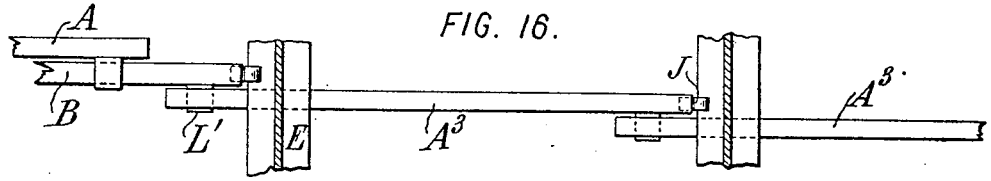
Figure 17:
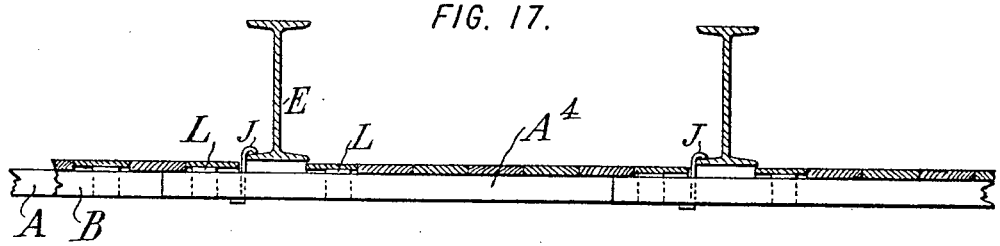
Figure 18:
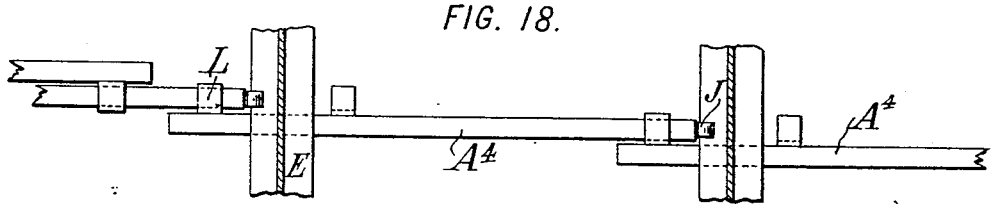
Figure 19:
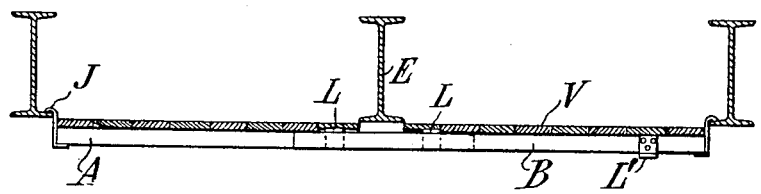

Figure 1 illustrates the centering applied to the building of a panel concrete flooring. Fig. 2 is a plan of the joists and supports of Fig. 1. Fig. 3 is a cross-section on the line 3 3 of Fig. 2. Fig. 4 is a section of a completed floor. Figs. 5 to 11, inclusive, are sections similar to Fig. 1, showing the whole or one end of different forms or applications of the invention. Fig. 12 is a plan of Fig. 11. Fig. 13 is a section similar to Fig. 1 of another style of floor. Fig. 14 is a section similar to Fig. 3, illustrating the use of metal joists. Figs. 15 and 16 are respectively a vertical section and plan of the joists in a centering which is continuous for several adjacent spans or bays. Figs. 17 and 18 are similar views of a different style of continuous centering. Fig. 19 is a vertical section of still another style.

The centering boards or plates are carried upon joists arranged to span the space between the beams and to be extended or contracted in accordance with the width of the bay, these joists in turn being supported from the beams.

In the floor shown in Figs. 1 to 4 the joists A B are supported upon boards C, which form the haunch of the concrete floor, and these boards in turn are supported upon clips D, fastened upon the lower flanges of the I-beams E. The clips D are of plate metal with punched-up portions F, adapted to be bent over the flanges of the beams to hold up the clips, and with extensions G, extending horizontally beyond the flanges of the beams and bent up at their ends, as at H. The haunch-boards C being supported upon the extensions G of a number of such clips may rest in the position shown in dotted lines until the joists are put in place, when the haunch-boards are moved outward from the I-beams to engage the ends of the joists, and the latter are supported upon the upper edges of the haunch-boards, as by means of extensions J, preferably consisting of the ends of Z-shaped metal pieces attached to the joists. The ends of the joists A B are preferably undercut obliquely, as illustrated, and the extensions J are curved over the edges of the haunch-boards for a purpose hereinafter specified.

In order that the joists A B shall span the space between the horizontal boards for bays of greater or less width, the two parts are arranged to overhang each other at intermediate points of the span, so that neither can be pressed down by the weight upon it. The overhanging may be accomplished, for example, by means of small angle-irons, having each a vertical portion K fastened to one of the parts A and B near its end and having a horizontal portion L extending laterally over the adjacent part. By this very simple means the combined joist can be made extensible to substantially twice the length of either one of the parts A and B or it can be made of a minimum length equal to one of said parts. The weight upon it cannot throw down one without throwing down the other, and is therefore carried by the two as if they were a single beam with ends resting on the haunch-boards C. At the same time their extension or contraction can be most easily accomplished, and their erection and withdrawal present practically no difficulties whatever. By merely inserting a sharp-pointed rod between them from the under side and twisting or bending it so as to separate the two parts A and B by a lateral movement they necessarily fall, and with them the haunch-boards and the centering boards. The undercutting of the ends of the parts A and B of the joist facilitates the withdrawal of the centering by permitting these parts to swing down freely, this movement being assisted by the curvature of the extension J. Thus the joist and the flooring V fall first for a certain distance, after which the haunch-boards are pulled down.

The joists described may be used to support any suitable centering board or boards. I prefer, however, to use long sheets V, of iron, resting upon joists arranged at suitable intervals. Such iron plates can be handled more rapidly than a number of wooden boards arranged side by side and are especially valuable in that they can be entirely saved, where the old wooden boards were nearly all lost or destroyed or were otherwise unfit for use on a later job. Sheet-iron suffers substantially no injury and is in such large sheets that it is impracticable for the workmen to carry it away. This with the joists and (in the case of panel floors) the haunch-boards constitute practically the whole of the centering, and, as will be apparent, all these may be completely saved after having been used once. Consequently the salvage represents a considerable profit. In the course of erection or some time before the concreting is commenced it may be necessary to stay the center against lateral movement, and this can be readily accomplished by introducing a rod or a board or other device M in the position shown in Fig. 1 between the haunch-boards and the I-beams, these rods or the like being arranged at widely-separated intervals and being withdrawn as soon as the concrete shall have been introduced into the spaces behind the haunch-boards.

The clips are preferably made of bar-iron, the tongues F being first stamped up to a vertical position, as indicated in dotted lines in Fig. 1, so as to permit their being bent down upon the flange of the beam by a hammer or the like. These clips have, furthermore, an advantage in that after the completion of the floor they may be used for supporting a suspended wire-lath ceiling. For example, in Fig. 4 the extensions G are shown as bent down, wire-cloth N being attached by ties O to channel-bars P, extending through the holes made by the punching out of the tongues F.

Where the entire floor is to be dropped below a beam, (as happens sometimes where beams of different depths are to be used,) the joists A B may be very readily supported at a suitable point—as, for example, by means of a clip Q, shown partly in elevation and partly in section in Fig. 5, having its ends R bent over the flange and having tongues S struck up from its sides to fit under the flange and prevent tilting or wabbling of the clip, the punching out of the tongues S leaving apertures T, through which the extensions J on the ends of the joists pass. A strip of wire-cloth U may be carried directly upon the clips to receive and hold concrete, which is to protect the under side of the beam. The flooring-boards V' are illustrated in this case as of the ordinary construction—that is, separate planks laid alongside of each other.

Where the floor is to be of exactly the depth of the beam, my improved joists, with the projecting portions J, are adapted to be supported directly upon the lower flanges of the beams, as indicated in Fig. 6. There is nothing to tend to draw the parts of the joist together or to otherwise lessen its reliability, and it will hold as if it were a single joist of exactly the right length until the two parts A and B are pried apart laterally. The flooring-board is a thin sheet V of iron in this case, serving to bring the under surface of the concrete down as low as the under face of the beam.

Figure 7:
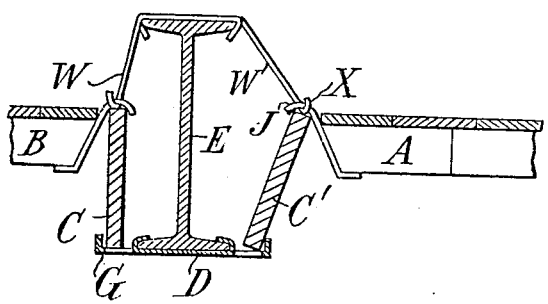
Figure 8:
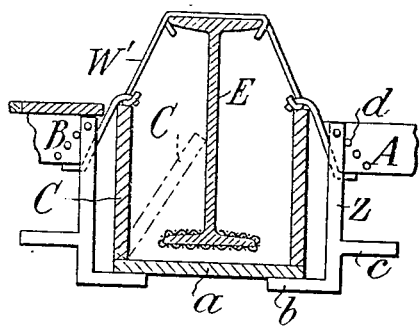

It is not essential that the joists be supported from the lower flanges of the beams. For example, as shown in Figs. 7 and 8, they may be supported from the upper flanges, as by means of straps W W', hooking over one side of the upper flange of the beam and extending over the top of the beam and down to the joists. The straps may be connected to the joists in any suitable manner—as, for example, by forming hooks X on their ends, hooking under the extensions J. The haunch-boards will be supported as in Fig. 1, and they may be vertical, as illustrated at C, or inclined, as illustrated at C'.

It is often specified that the haunches of the arch shall extend down and around the under side of the beam, and in this case the arrangement shown in Fig. 8 may be adopted. The joists A and B are supported by two straps W', extending over the upper flange of the beam, and special supporting-pieces Z of light metal are provided for supporting the haunch-boards and the bottom board $a$, running under the flange of the beam. The supports Z are metal strips with arms $b$ at their lower ends extending laterally under the bottom $a$. Preferably, also, arms $c$ at a higher elevation are provided on the supports Z, so that by reversing the supports they may be adapted for beams of less depth. The supports may be suspended from the joists in any suitable way—as, for example, by providing a number of pins $d$, arranged in an oblique line near the ends of the joists. The hanging of a support Z upon one of the pins $d$ not only supports it, but holds it against outward displacement by the engagement of the next outer pin with its outer edge. After the erecting of the centering for floors of this type it is a common experience to find that considerable quantities of dirt have fallen into the inclosed space around the beam, necessitating the actual removal of certain portions of the centering in order to get the dirt out of the way to permit the introduction of the concrete. With the system described this disadvantage is avoided. The haunch-boards C can be laid against the beam E in the manner indicated in dotted lines, so that any dirt falling over the centering beyond the ends of the joists will be deflected and drop through to the floor below. The haunch-boards will be returned to their proper vertical position only when the laying of concrete is about to commence.

Figure 9:
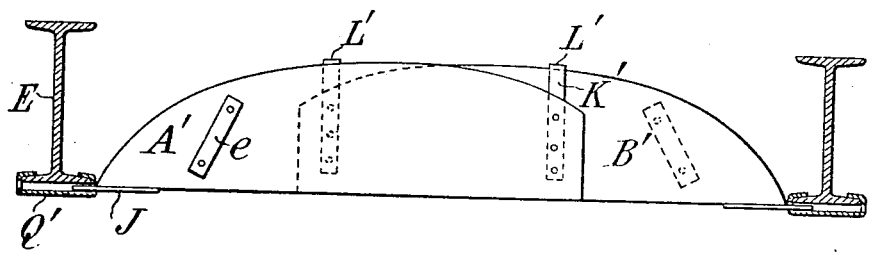
Figure 10:
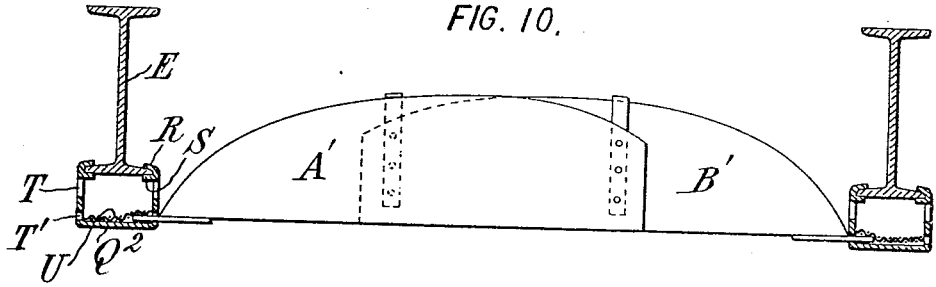
Figure 11:
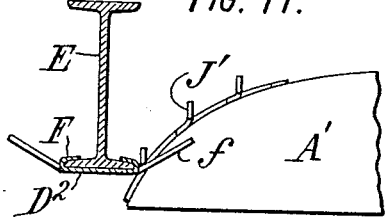

The invention is applicable not only to the building of flat arches, as shown in the foregoing figures, but may also be applied to the building of segmental arches. For example, in Figs. 9 and 10 is shown a pair of joists A' B', the upper contour of which is of such shape as to form a segmental arch with a more or less elongated central portion depending upon the extension or contraction of the joists, which in turn depends upon the width of the bay. These segmental joists are provided also with lateral extensions in the form of straps or angle-pieces L', arranged near the end of each part and so as to overhang the other. These joists are preferably made of considerable height and supported at their lower edges. In order to strengthen them against splitting, braces $e$ may be nailed on their outer vertical faces. The extension J, by means of which they are supported, may be a simple flat plate which engages with any suitable supporting device—such, for example, as the clip Q', similar to the clip Q of Fig. 5, but having less depth. By making the joists themselves segmental instead of using straight joists with separate haunch-boards the under side of the floor or arch may be raised or lowered by merely supporting the joists at a higher or lower level. This operation may be very simply provided for by providing a clip having a number of supports at different levels or by providing a number of extensions upon the joists, which extensions are at different levels. The former construction is shown in Fig. 10 and the latter in Figs. 11 and 12. According to Fig. 10 a clip $Q^2$ is provided, having its ends R bent over the bottom flange of the I-beam and having tongues S bearing up against the under side, and thus serving to prevent tilting of the clip in the direction of the length of the beam and at the same time providing apertures T, into which the extensions J upon the ends of the joists may be inserted, the clip being provided with one or more additional apertures T' below the aperture T and which permit of lowering the joist. In the construction shown in Figs. 11 and 12 the clip $D^2$ has its ends split to provide a central tongue F, which may be bent over the lower flange of the beam, and to provide side tongues $f$, separated by a space slightly greater than the width of the parts A' and B' of the joist and projecting outward so as to embrace the end of the joist. The joist at the same time is provided with a number of lateral extensions J' at different levels and at different points in the length of the joist. By dropping the joist with any desired one of the several pairs of extensions J' between the tongues $f$ of the clip the joist will be held up at the desired elevation. The tongues $f$ of the clip also hold the joist against tilting laterally and are particularly effective for this purpose, as the lateral strain comes edgewise on these tongues.

In building a floor with this improved centering the clips engaging the lower flanges of the beams or the straps or hooks engaging the upper flanges are first put in place, after which the joists and the haunch-boards (where these are used) are supported from the clips or hooks already in place, the joists being extended or contracted, as it were, automatically, the ends of the two parts of each joist being fixed in place and the central portions being then brought together without the necessity of any manual adjustment of one relatively to the other. The floor-boards, either wooden planks or sheets of iron, are then placed upon the joists and the filling in of concrete proceeds in the usual manner. The removal of the centering is a work of the briefest possible time. A workman stands below with a long prying-tool and inserts it between the parts A and B of each of the joists in succession and with a quick movement separates these joists laterally and drops substantially the entire centering. It is only necessary where the joists are supported from the upper flanges of the beams that the hooks or straps be cut beforehand. As these are in a most accessible position, the cutting of them is not at all difficult.

While obviously the segmental arch cannot be extended and contracted as greatly as the flat arch, yet it is to be observed that it may be extended until the extensions L' come against each other. Any slight depression in the center of the arch can have no bad effect beyond the slight excess of concrete required, and even this might be corrected by laying the floor of the centering level above the depression.

The straps or hooks W or W' may be made in a single piece extending down on opposite sides of the beam. Such a strap or hanger is indicated at $W^2$, Fig. 13. This figure also illustrates a simplified manner of supporting a centering around the under side of the beam. The hanger $W^2$ extends below the beam and is formed on its ends with hooks X', in which the lower edges of the haunch-boards C C' rest. The joist A B is then supported from the haunch-boards, as in Fig. 1. The board $a$ for supporting the concrete under the beam is subjected to little strain and can be carried by nails $g$, driven through the lower edges of the haunch-boards.

In place of the wooden parts A B of the girder metal parts may be substituted—such, for example, as the angle-irons $A^2$ $B^2$ in Fig. 14—the horizontal flange of each being bent over at a point near its end to form lateral extensions L.

The principal point of value in the supporting-joist arises from the arranging of the overhanging extensions L near the ends of the parts of the joist so that these two parts can be drawn out to form a joist nearly double their length or may be slid toward each other to form a joist of substantially the length of one of the parts. The combined joist is very rigid, each part being supported by J and L at its opposite ends. By reason of the supporting-overhang L being a lateral one neither of the two parts interferes with the longitudinal movement of the other in shortening or lengthening the joist.

The shape of the extension J is important. If it were made horizontal, the swinging down of the free ends of the joists would throw the extensions up against the concrete, which would therefore resist the falling of the joists. Therefore the extensions J are made curved or hook-shaped at their upper ends, while their bodies lie outside of the supports, (the haunch-boards C in Fig. 1 or the vertical line through the edge of the beam-flange in Fig. 6.) In the falling of the joists the extensions J are pulled out between the concrete and the supports by a circular sliding movement which draws the extensions out endwise rather than by a pivotal movement. Whether the body of the extension J shall be fastened to the end of the joist as indicated or shall be fastened thereto in any other manner is not important, the shape and arrangement of this part depending upon the shape of the end of the joist.

Where the joists are at the lowest part of the structure, as in Figs. 15 to 19, their ends may be made substantially vertical, so as to extend the flooring V close up to the flanges of the I-beams. Joists with undercut ends may, however, be used equally well in such situations. (See Figs. 5 and 6.)

This style of centering lends itself freely to a continuous arrangement for simultaneously building the floors of a number of adjacent or successive bays. A most convenient arrangement for this purpose is indicated in Figs. 15 and 16, which are supposed to represent a continuation to the right of Fig. 6. For this purpose the part B of the joist A B in the first bay may be provided near its beam end with a lateral extension L' in position to support the free end of a joist A³, which extends entirely across the second bay. The joist A³ may be provided in turn with an extension L' near its beam end for the support of the free end of a joist A³ in the next bay, each of the joists A³ having an extension J for supporting one of its ends upon a beam-flange. The joists A³ are evidently automatically extensible in length, it being only necessary to support the beam end and then to swing the free end laterally upon the extension L' in the next bay. When the joist A B is dropped by separating its parts, the part B will not ordinarily fall entirely clear of the beam, being apparently restrained to some extent by the friction of the joist A³ upon the lateral extension L'. A slight lateral separation of the part B from the free end of the joist A³ will then completely drop the part B. The joist A³ will then fall entirely away from its supporting-beam unless there is a second joist A³ supported thereby, in which case the joist A³ will fall only to a sharp angle and will be held by the extension J and the friction of the free end of the adjacent joist. Thus the entire series of centers depends each upon the next, and they may be dropped one after another in rapid succession. It is preferable to have the extensions L' for supporting a joist in an adjacent bay arranged near the beam end of the joist B or A³, as the case may be. It is then in a fixed position and can be quite close to the beam, so that the joist in the adjacent bay does not need to extend much beyond the length of its own bay. However, the same operation may be obtained by providing a lateral extension L from the upper edge of the free end of the joist which is to span the adjacent bay, as in the case of the joist A⁴, Figs. 17 and 18. In this case it is desirable to have two such extensions L spaced apart a distance slightly greater than the width of the beam-flange, so that the joist may be used for greater or smaller spans. It is observed that with this construction the collapsing of the center in the first bay is followed by the complete collapse of the centers in the other bays in succession.

Where a plurality of short spans are to be built, the simple centering of Fig. 6 is well adapted to extend with one pair of joists over such a plurality of spans. Such a construction is illustrated in Fig. 19. The parts A and B of the joist are drawn out to make approximately as long a joist as possible, or extra long members A and B may be made for the purpose. As no intermediate support is necessary the entire centering may be passed under one or more intermediate beams E, being supported only by extensions J upon the outer ends of the joist and being collapsible at one operation. This multiple-span centering might also be used in connection with the successively dependent centerings of Figs. 15 and 17—as, for example, by providing a lateral extension L' from the lower edge of the part B near its beam end.

I do not claim herein all of the specific features described, the claims of the present application being based on the two-part joist described in whatever construction it may be used and on the particular arrangement for supporting the centers of a plurality of contiguous bays. I do not, however, disclaim the several constructions illustrated and described, but not specifically enumerated in the claims of this application.

Though I have described with great particularity of detail certain specific embodiments of the invention, yet it is not to be understood therefrom that the invention is limited to the specific embodiments disclosed. Various modifications may be made by those skilled in the art in detail and in the arrangement and combination of the parts without departing from the invention.

What I claim is—

1. A centering including joists made in two parts the free end of one overhanging the other laterally, said parts adapted to be separated by a lateral movement.

2. A centering including a joist composed of parts A and B, each having a lateral extension L near its free end adapted to overhang the other and adapted to be separated from the other by a lateral movement.

3. A centering including a joist composed of parts A and B, each having a lateral extension L near its free end adapted to overhang the other and adapted to be separated from the other by a lateral movement, and having an extension J for supporting it at the beam end.

4. A centering including a joist having an extension J at its end, with a hooked upper portion and a body lying entirely outside of the support.

5. A centering including a joist composed of parts A and B each having a lateral extension L near its inner end adapted to overhang the other and adapted to be separated therefrom by a lateral movement, and having an extension for supporting it at the outer end, said parts being undercut at their outer ends.

6. A centering extending between two beams and supported therefrom and adapted to support one end of a centering in an adjacent bay.

7. A centering extending between two beams and supported therefrom and having near one floor-beam a lateral extension adapted to support an end of a centering in an adjacent bay.

8. The combination of a center extending between two beams and supported therefrom, and a center in the next bay supported at one end upon the first-mentioned center and at its opposite end upon a floor-beam.

9. A centering including joists made in two parts one overhanging the other laterally and near its free end, and having a lateral extension near its beam end adapted to support an end of a joist in an adjacent bay.

In witness whereof I have hereunto signed my name in the presence of two subscribing witnesses.

ROSWELL F. EASTON.

Witnesses:
DOMINGO A. USINA,
FRED WHITE.